United States Patent
Sande et al.

(10) Patent No.: US 9,760,128 B2
(45) Date of Patent: Sep. 12, 2017

(54) PROTECTIVE ENCLOSURES FOR PORTABLE ELECTRONIC DEVICES AND RELATED METHODS

(71) Applicant: Cyber Acoustics, LLC, Vancouver, WA (US)

(72) Inventors: Greg Mitchel Sande, Aloha, OR (US); David Dohna Lewin, Portland, OR (US); Todd Anthony Miller, Tualatin, OR (US)

(73) Assignee: Cyber Acoustics, LLC, Vancouver, WA (US)

( * ) Notice: Subject to any disclaimer, the term of this patent is extended or adjusted under 35 U.S.C. 154(b) by 0 days.

(21) Appl. No.: 14/716,263

(22) Filed: May 19, 2015

(65) Prior Publication Data
US 2016/0291643 A1    Oct. 6, 2016

Related U.S. Application Data

(60) Provisional application No. 62/140,409, filed on Mar. 30, 2015.

(51) Int. Cl.
G06F 1/00 (2006.01)
G06F 1/16 (2006.01)
A45C 11/00 (2006.01)

(52) U.S. Cl.
CPC ............ *G06F 1/1656* (2013.01); *A45C 11/00* (2013.01); *G06F 1/1628* (2013.01);
(Continued)

(58) Field of Classification Search
CPC .... A45F 2200/0516; A45F 5/00; A45F 5/021; A45C 2011/002; A45C 11/00;
(Continued)

(56) References Cited

U.S. PATENT DOCUMENTS 4,850,657 A * 7/1989 Placke ............... H05K 7/20145
                                              220/4.21
6,567,651 B2 * 5/2003 Whitley ................... A45F 5/00
                                              224/929
(Continued)

FOREIGN PATENT DOCUMENTS

AU      2010101318 A4    12/2010

OTHER PUBLICATIONS http://www.otterbox.com/en-us/ipad-air-2/defender-series-case/apl2-ipad-air-2.html?dwvar_apl2-ipad-air-2_color=20#start=11, printed Jun. 9, 2015, 7 pages.
(Continued)

*Primary Examiner* — Peter Helvey
(74) *Attorney, Agent, or Firm* — Harness, Dickey & Pierce, P.L.C.

(57) ABSTRACT

A protective enclosure is provided for securing portable electronic devices within the enclosure. The enclosure generally includes a front structure, a back structure, and at least one bracket. The front structure defines at least one aperture for permitting access to a display of the computing device. The back structure is configured to couple to the front structure. The front structure and back structure are configured to cooperate to substantially enclose at least four corners of the portable computing device. The at least one bracket is configured to engage the front and back structures, and includes a tamper-resistant fastener configured to secure the front and back structures together on the portable computing device.

20 Claims, 8 Drawing Sheets

(52) U.S. Cl.
CPC ... *A45C 2011/002* (2013.01); *A45C 2011/003* (2013.01); *G06F 2200/1633* (2013.01)

(58) Field of Classification Search
CPC ............. A45C 2011/003; G06F 1/1656; G06F 1/1628; G06F 2200/1633
USPC .................................................. 224/930, 600
See application file for complete search history.

(56) References Cited

U.S. PATENT DOCUMENTS

| | | | | |
|---|---|---|---|---|
| 7,370,840 | B1 * | 5/2008 | Deconinck | E05B 73/0082 248/316.1 |
| 7,630,745 | B2 * | 12/2009 | Chen | A45F 5/02 379/433.01 |
| 8,281,924 | B2 | 10/2012 | Westrup | |
| D670,279 | S | 11/2012 | Veltz et al. | |
| D674,803 | S | 1/2013 | Westrup | |
| D685,358 | S | 7/2013 | Armstrong et al. | |
| D690,305 | S * | 9/2013 | Wen | D14/440 |
| 8,616,422 | B2 * | 12/2013 | Adelman | A45F 5/00 224/191 |
| D718,316 | S | 11/2014 | Veltz et al. | |
| 8,973,795 | B2 * | 3/2015 | Chiu, Jr. | A45F 5/021 224/218 |
| 9,004,330 | B2 * | 4/2015 | White | A45F 5/00 224/256 |
| 9,419,669 | B2 * | 8/2016 | Smith | A45C 5/02 |
| 2005/0058494 | A1 * | 3/2005 | Ansell | G07B 17/00193 400/691 |
| 2006/0138182 | A1 * | 6/2006 | Carlsson | A45F 5/10 224/257 |
| 2012/0305422 | A1 * | 12/2012 | Vandiver | H04M 1/185 206/320 |
| 2013/0009413 | A1 * | 1/2013 | Chiu, Jr. | A45F 5/021 294/142 |
| 2013/0265643 | A1 | 10/2013 | Armstrong | |
| 2013/0265644 | A1 | 10/2013 | Armstrong | |
| 2015/0068934 | A1 | 3/2015 | Armstrong | |
| 2015/0150362 | A1 * | 6/2015 | Lei | A45F 5/004 224/162 |
| 2015/0296651 | A1 * | 10/2015 | Voss | H05K 5/0269 174/535 |
| 2016/0166321 | A1 * | 6/2016 | Amsler | A61B 19/02 607/5 |

OTHER PUBLICATIONS https://store.griffintechnology.com/ipad/survivor-custom-case-for-ipad-2-3-4th-gen, printed Jun. 9, 2015, 8 pages.

* cited by examiner

PROTECTIVE ENCLOSURES FOR PORTABLE ELECTRONIC DEVICES AND RELATED METHODS

CROSS-REFERENCE TO RELATED APPLICATION

This application claims the benefit of, and priority to, U.S. Provisional Application No. 62/140,409, filed on Mar. 30, 2015. The entire disclosure of the above application is incorporated herein by reference.

FIELD

The present disclosure generally relates to protective enclosures (e.g., covers, etc.) for portable electronic devices (e.g., portable computing devices, etc.) and, more particularly, to tamper resistant protective enclosures for securing the portable electronic devices, and methods related thereto.

BACKGROUND

This section provides background information related to the present disclosure which is not necessarily prior art.

Portable computing devices are known to be carried and used in a variety of different environments. Users often select certain portable computing devices because of the size and/or weight of the devices (broadly, their bulkiness, or lack thereof), which often impacts the portability of the devices. In response, designers and manufacturers have sought to either reduce the sizes/weights of the devices and/or expand displays in such devices to provide substantial viewing areas for particular footprints. The improvements in size, and performance, of certain portable computing devices, however, have left them vulnerable to portability (i.e., continuous handling, rough handling, impacts, drops, and moisture) which has the potential to cause damage to the devices. Protective covers are known to be applied to certain portable computing devices, not only to provide protection to the devices but also to offer some amount of personalization.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Enclosures are often used with portable computing devices to provide protection and, in some instances, personalization to the devices. In certain instances, users, especially young users, remove the enclosures, often, to reduce the overall size of the portable computing devices for ease of use and/or transport.

Exemplary embodiments of the present disclosure generally relate to enclosures that can be installed to portable computing devices for protecting the devices in the enclosures. In addition, exemplary embodiments of the enclosure are tamper resistant whereby, once the enclosures are installed to the portable computing devices, users are substantially inhibited from removing them from the portable computing devices and potentially exposing the portable computing devices to damage. In particular, in one exemplary embodiment, an enclosure includes a front structure and a back structure, which configured to receive and at least partially enclose a portable computing device generally therebetween, and at least one bracket engageable with the front and back structures to secure them together on the portable computing device, where the at least one bracket includes at least one tamper-resistant fastener to help inhibit removal of the enclosure from the portable computing device, once installed.

It should be appreciated that enclosures of the present disclosure may be used with any desired portable computing devices including, for example, tablet-computing devices, smartphones, media players (e.g., music players, video devices, gaming devices, etc.), GPS devices, etc.

With reference now to the drawings, FIGS. 1-5B illustrate an exemplary embodiment of an enclosure 100 (e.g., a protective enclosure, a cover, etc.), including one or more aspects of the present disclosure. The enclosure 100, and its components described herein, can be made from any suitable material, such, for example, plastic, metal, hard rubber, elastomeric materials, composite, latex, and/or combinations thereof. In one embodiment, for example, the enclosure 100 and various ones of its components are made of thermoplastic polyurethane (TPU). In should be appreciated that different components may be made from different materials, including, for example, certain components (or parts thereof) may be formed or made from less rigid materials to secured the enclosure to and/or about the portable computing device and/or to protect the computing device (e.g., absorb impacts, etc.), while other components (or parts thereof) may be formed or made from more rigid materials to secured the enclosure to and/or about the portable computing device and/or to protect the computing device (e.g., deflect impacts, etc.).

Figure 1:
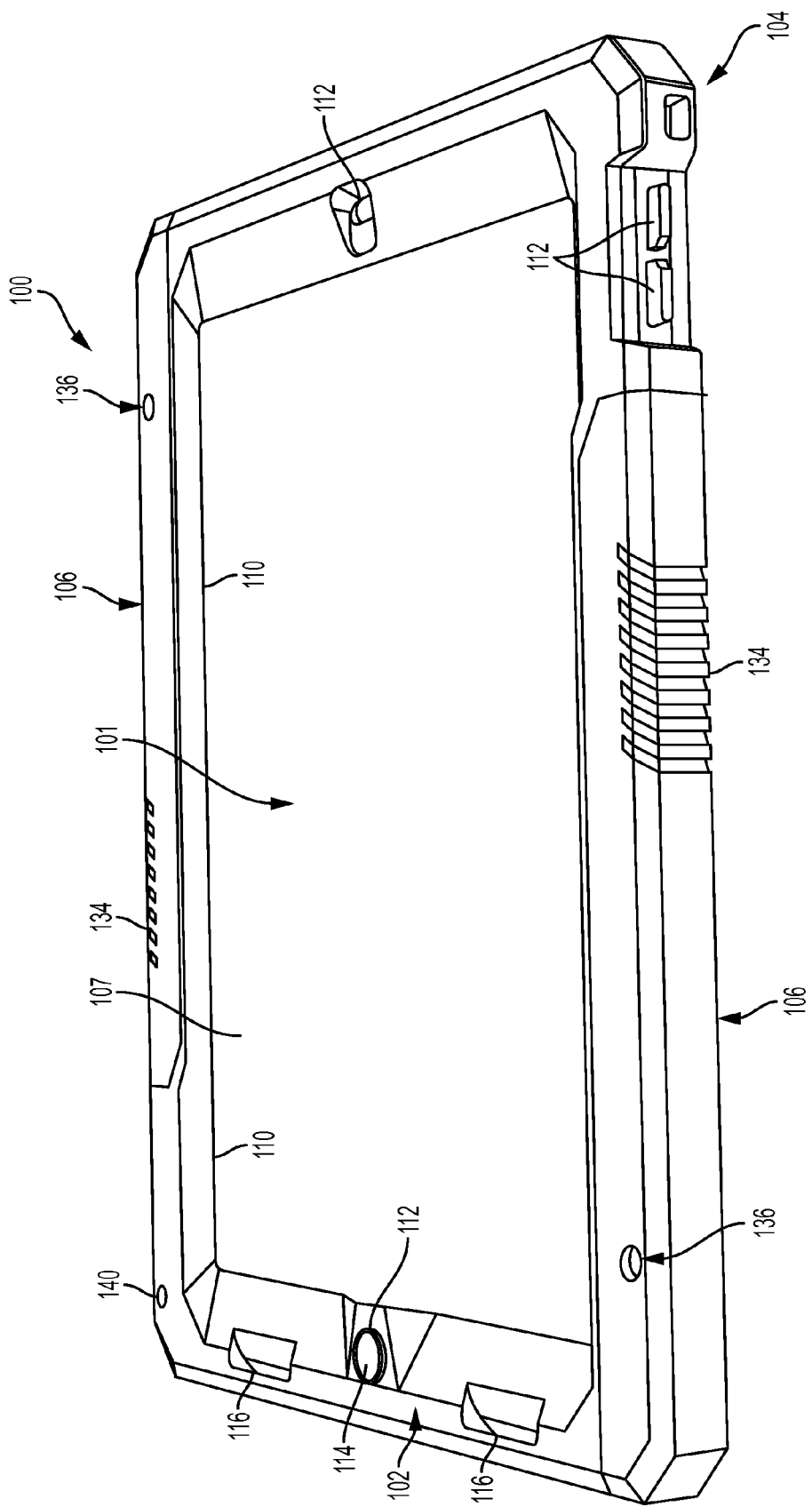
FIG. 1 is an upper perspective view of an exemplary embodiment of a protective enclosure suitable for use in securing a portable computing device therein in accordance with the present disclosure, with a portable computing device shown in the enclosure.
Figure 7:
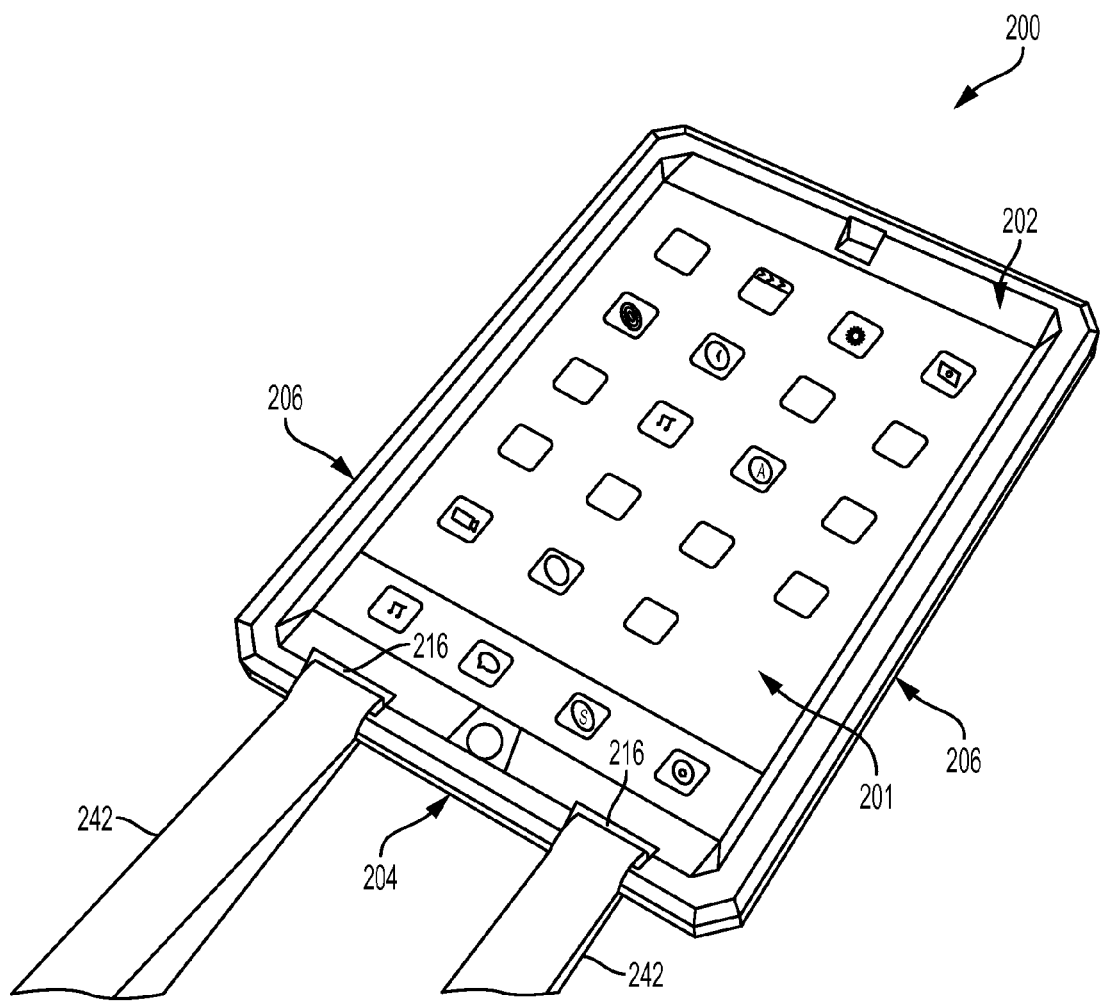
FIG. 7 is an upper perspective view of another exemplary embodiment of a protective enclosure suitable for use in securing a portable computing device therein in accordance with the present disclosure, with a portable computing device shown in the enclosure and with straps of the enclosure shown.
Figure 8:
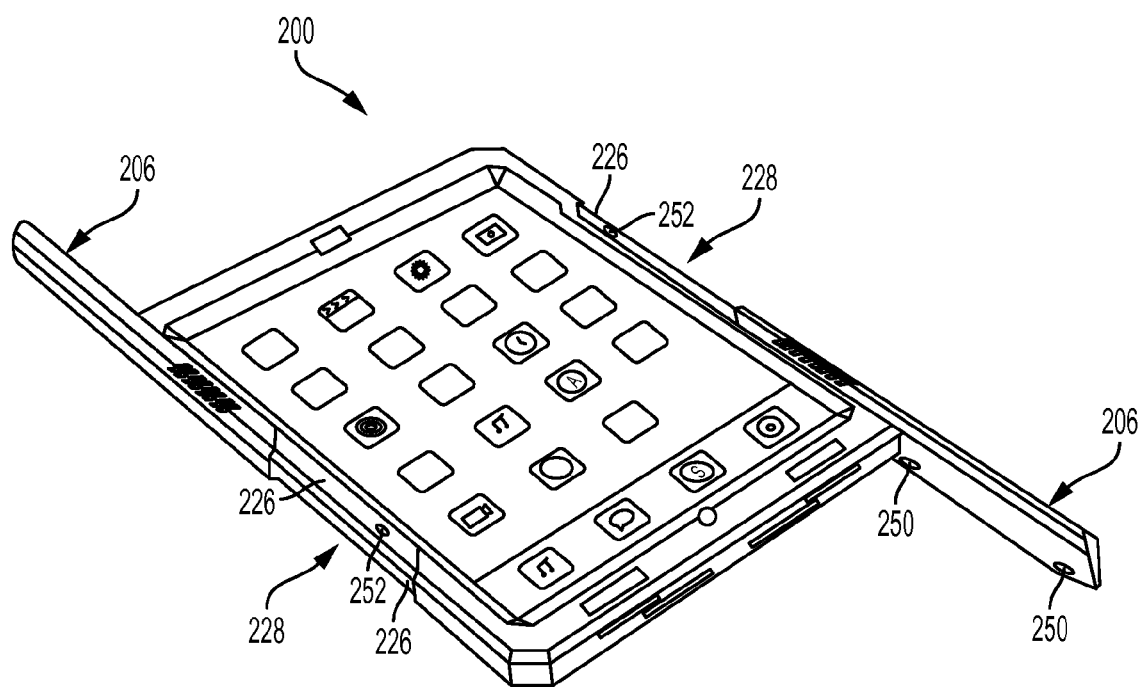
FIG. 8 is another upper perspective view of the enclosure of FIG. 7, with carrying straps of the enclosure removed and with brackets of the enclosure shown partially extended.

As shown in FIG. 1, the enclosure 100 is configured to secure (and enclose) a portable computing device 101 therein (or portable computing device 201 illustrated in FIGS. 7 and 8, etc.). In so doing, the enclosure 100 can provide protection to the portable computing device 101 against damage, etc. from various use occurrences such as, for example, dropping, rough handling, blunt force, etc. In addition, the illustrated enclosure 100 is also generally tamper resistant, thereby inhibiting users from removing the enclosure 100 from the portable computing device 101 once installed. This will be described in more detail hereinafter.

Figure 2:
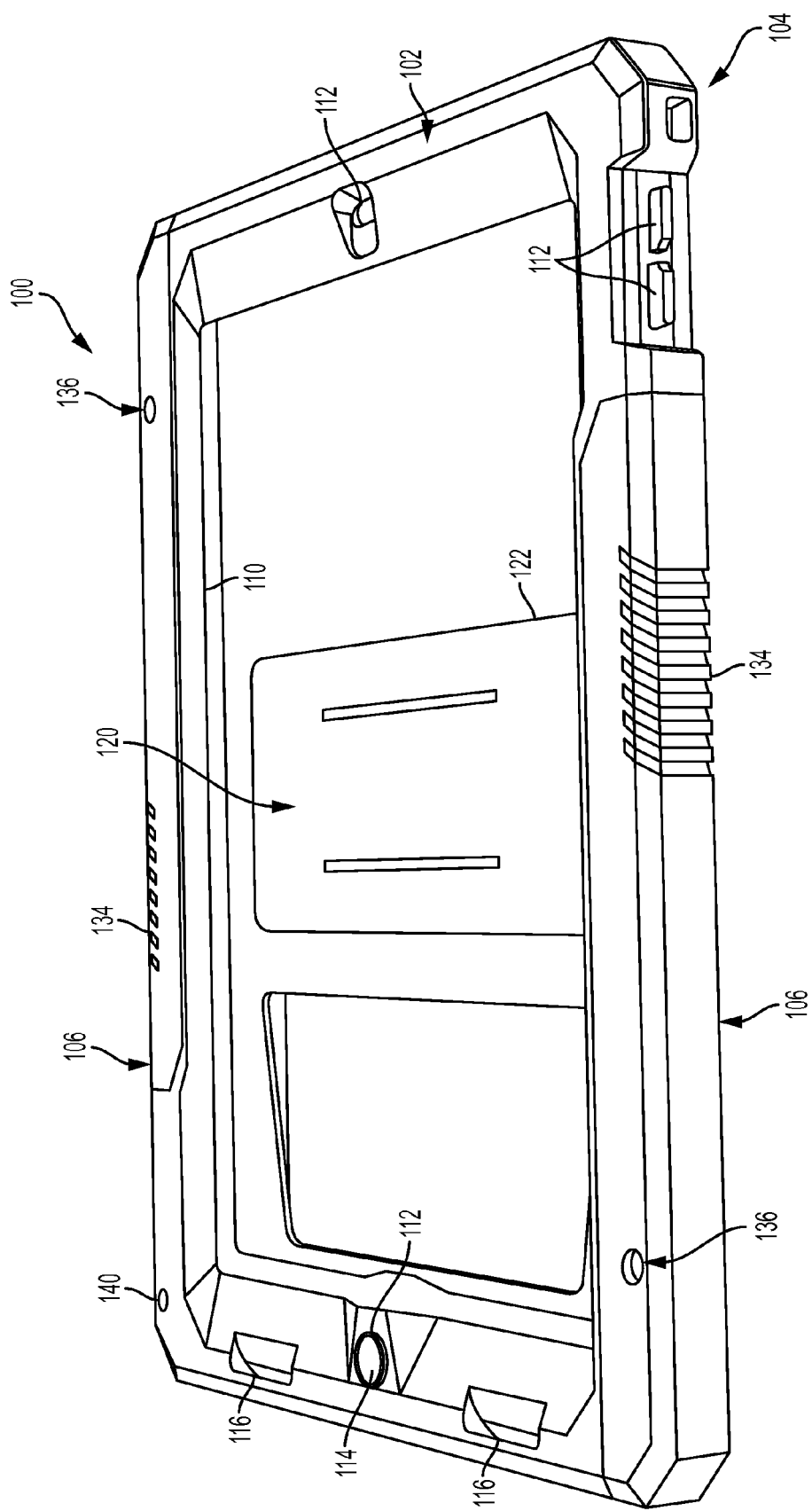
FIG. 2 is the perspective view of FIG. 1, with the portable computing device removed from the enclosure.
Figure 3:
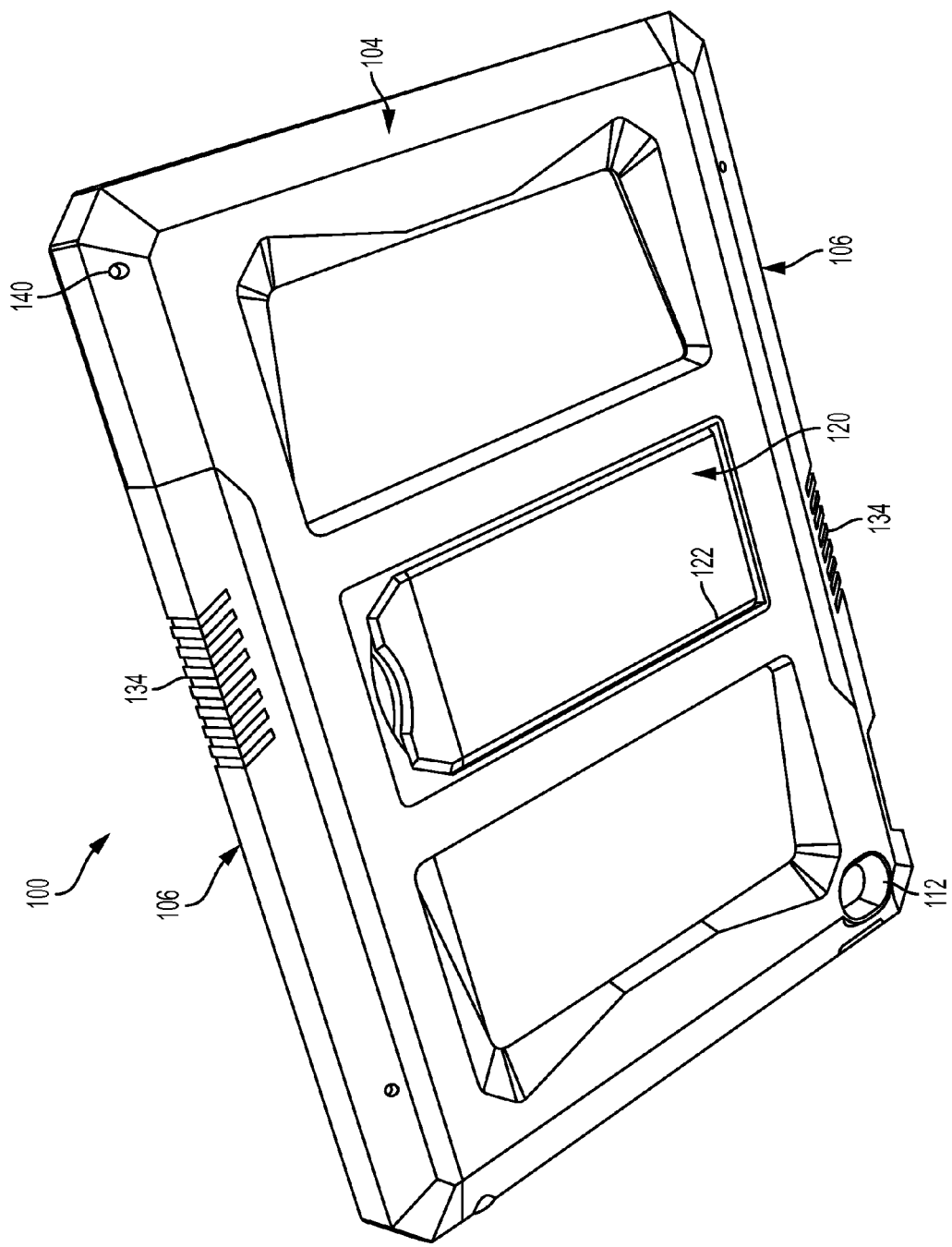
FIG. 3 is a lower perspective view of the enclosure of FIG. 2.

With additional reference now to FIGS. 2 and 3, the enclosure 100 generally includes a front structure 102 (e.g., a first structure, a first portion, etc.), a back structure 104 (e.g., second structure, a second portion, etc.), and two brackets (each indicated at 106). The front and back structures 102, 104 are each configured to receive at least part of the portable computing device 101 therein. In particular, the front structure 102 is configured to receive (and be positioned generally over) a display screen side of the portable computing device 101, and the back structure 104 is configured to receive (and be positioned generally over) a back side of the portable computing device 101. In addition, the front and back structures 102, 104 include alignment tabs 108 (or ridges) and mating receptacles 109 configured to guide the front structure 102 and the back structure 104 together, into a proper mating position generally with the portable computing device 101 therebetween, and to inhibit relative lateral movement of the front and back structures 102, 104. The two brackets 106 are then configured to engage generally opposite edge portions of the front and back structures 102, 104 to secure the front and back structures 102, 104 together (with the portable computing device 101 disposed there between). While two brackets 106 are provided in the illustrated enclosure 100, it should be appreciated that a different number of brackets may be used (e.g., one bracket, three brackets, etc.).

When positioned together, the front and back structures 102, 104 of the enclosure 100 sit generally flush with each other (either engaging each other in generally face-to-face contact or overlapping each other). And, the portable computing device 101 is generally enclosed within the front and back structures 102, 104, with a display screen 107 of the portable computing device 101 remaining exposed though the front structure 102 (via aperture 110) for access by a user. In the illustrated embodiment, the front and back structures 102, 104 surround (or enclose) all four corners of the portable computing device 101. In other embodiments, however, at least one corner of the portable computing device 101 may be left exposed when the front and back structures 102, 104 are installed to the portable computing device 101, and the brackets 106 (when engaged to the front and back structures 102, 104) then cover the at least one exposed corner (such that all four corners are still surrounded by the enclosure 100). Also in the illustrated embodiment, each of the front and back structures 102, 104 is generally rectangular in shape, and both have similar length and width dimensions (although this in not required). As such, when installed to the portable computing device 101, the enclosure 100 has a corresponding generally rectangular shape or profile. In other embodiments, enclosures may have front and/or back structures with shapes other than rectangular, for example, generally square, generally hexagonal, generally octagonal, etc.

The front and back structures 102, 104 of the enclosure 100 include a plurality of apertures (or openings) defined therein to allow access to the portable computing device 101 through the enclosure 100. For example, the front structure 102 includes the aperture 110 to allow the user to access the display screen 107 of the portable computing device 101, as well as various apertures (each indicated at 112) to allow the user to access other features of the portable computing device 101, such as a front camera, a home button (via elevated toggle 114 and aperture 112), a charging port, an earphone port/plug, volume rockers/buttons, etc. Similarly, the back structure 104 includes apertures (e.g., aperture 112, etc.) to allow the user to access a rear camera, etc. The apertures may be particularly structured to permit ease of insertion and/or ejection of plugs, cables, etc. For example, the aperture for the earphone port/plug defines a funnel structure to guide a cable/plug associated with the earphone into the earphone port/plug. As should be appreciated, various different configurations of the apertures of the enclosure 100, and/or the enclosure itself more generally, may be customized to the particular portable computing device.

In addition, the front and/or back structures 102, 104 include apertures 116 for receiving carrying straps, and may further include additional apertures to allow access to one or more microphones, speakers, etc. on the portable computing device 101. Further, overlays and/or grommets may be associated with various ones of the apertures 112 to help provide protection to buttons or ports of the portable computing device 101 generally aligned with the apertures 112. In one embodiment, an overlay (of the enclosure) may be provided for one or more buttons of the portable computing device 101 to provide a tactile responses to the user (e.g., with the overlay generating the tactile response, or by translation of a tactile response from the portable computing device, etc.), etc. With that said, it should be appreciated that the various apertures 110, 112, 116 of the enclosure 100 can have any desired shape within the scope of the present disclosure, for example, funnel-shaped to allow easier access to corresponding components of the portable computing device 101 (e.g., an earphone port, etc.), etc.

Further, the front structure 102 of the enclosure 100 also includes a thickness (or thickness dimension) to allow the front structure 102 to protrude outward from the portable computing device 101 (e.g., from the display screen 107 of the portable computing device 101, etc.) when the front structure 102 is engaged onto the portable computing device 101 (and when the enclosure 100 is installed to the portable computing device 101). As such, the front structure 102 (and its thickness) provides a clearance (or cushion) for the portable computing device 101 that, if the portable computing device 101 falls with the display screen 107 oriented generally face down onto a surface, generally inhibits the display screen 107 from impacting the surface (and potentially breaking).

With continued reference to FIG. 3, the enclosure 100 also includes a stand 120 associated with the back structure 104. The stand 120 is received by the back structure 104 from an inner part of the back structure 104 (see FIG. 4), and extends through cavity 122. And, grooves 124 defined along the cavity 122 hold (and support) the stand 120 in position at the back structure (e.g., via a mating fit with the stand 120, via friction, via a snap-fit coupling, via one or more fasteners, etc.). As such, when the portable computing device 101 is inserted into the back structure 104, the stand 120 is substantially secured to the back structure 104 (e.g., via the grooves 124, via the portable computing device 101, via combinations thereof, etc.). However, the stand 120 is still operable to pivot relative to the back structure 104 (to support the enclosure 100, and the portable computing device 101 therein, at one or multiple different angles). In some embodiments, the portable computing device 101 alone operates to retain the stand 120 in the back structure 104 of the enclosure 100, for example, by holding, pressing, compressing, etc. the stand 120 against the back structure 104.

As described, in the illustrated embodiment, the stand 120 is removeably coupled to the back structure 104 via the grooves 124 defined along the cavity 122. In other embodiments, the stand 120 may be removeably coupled to the back structure 104 differently, for example, via fasteners, adhesives, etc. In addition, in still other embodiments, the stand 120 may be coupled to the back structure 104 and removeable therefrom while the portable computing device 101 is disposed within the enclosure 100 (e.g., via a locking mechanism or other structure that allows the stand 120 to click into, or snap-fit into, the back structure 104 or other structure associated with the enclosure 100, etc.). In still further embodiments, the stand 120 may be integrally formed with the back structure 104, etc. In addition, the illustrated back structure 104 defines additional cavities adjacent the cavity 122, which may, in some examples, provide gripping surfaces for the user, etc.

In operation, the stand 120 is moveable (e.g., pivotable, etc.) between a stored position and a deployed (or extended) position (e.g., manually; via a locking mechanism that, when actuated, allows the stand 120 to be released from the stored position; etc.). In the stored position, the stand 120 is received generally within the cavity 122 of the back structure 104 (e.g., lying generally flat within the cavity 122, lying generally against the back of the portable computing device 101, etc.), with an outer surface of the stand 120 substantially flush with an outer surface of the back structure 104 (although this is not required). The stand 120 may be held in the stored position by a locking mechanism, or by friction, etc. In the deployed position, the stand 120 extends, or protrudes, generally away from the back structure 104 at an angle relative to the back structure 104 for supporting the enclosure 100 (and the portable computing device 101 secured therein) on a surface at a desired angle (e.g., at an angle between zero degrees and ninety degrees, at an angle of abut forty-five degrees, etc.), etc.

Figure 4:
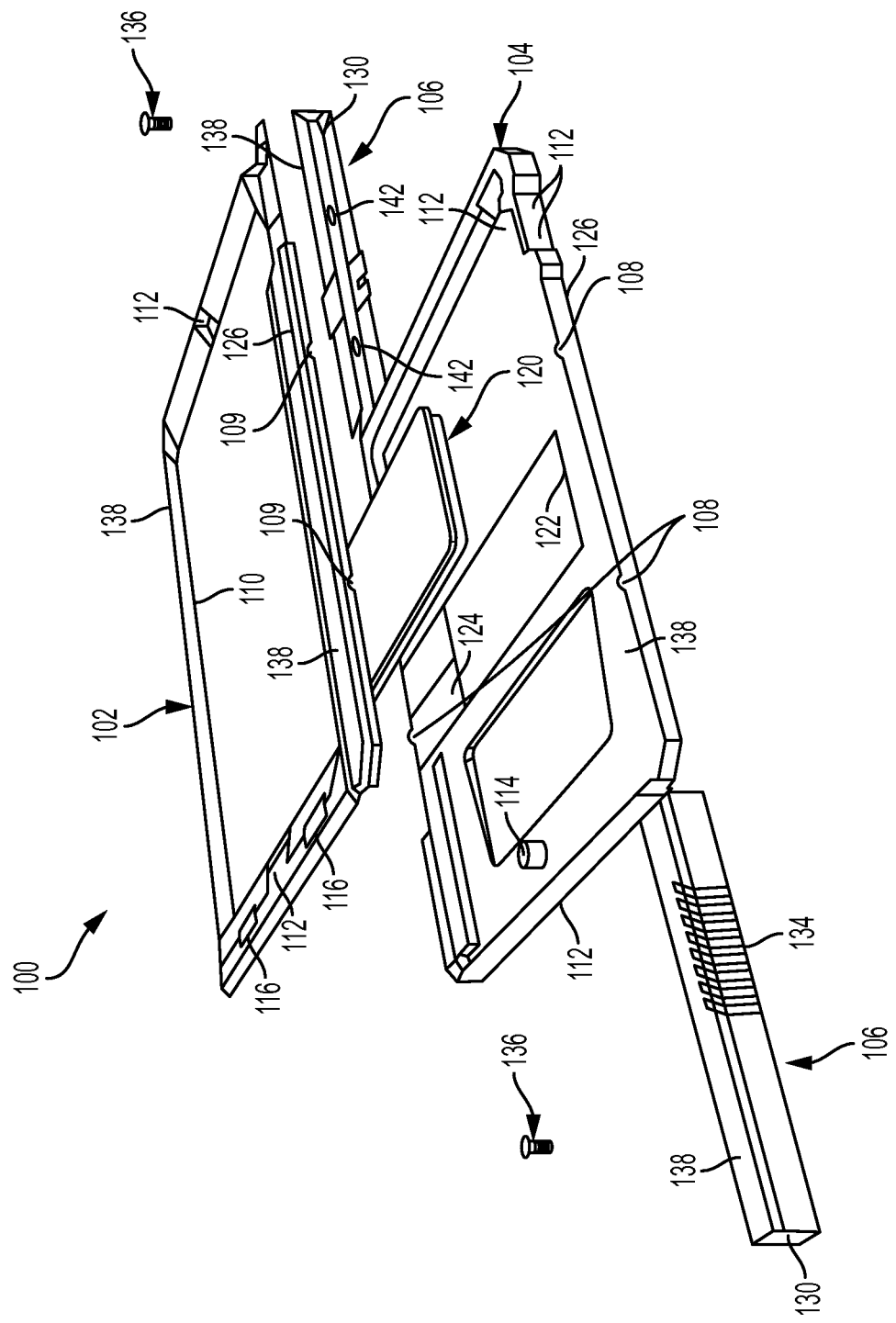
FIG. 4 is an exploded perspective view of the enclosure of FIG. 2.
Figure 5A:
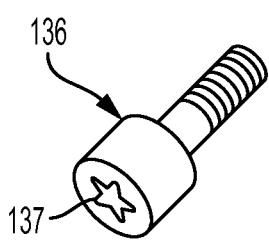
FIG. 5A is a perspective view of a fastener suitable for use with the enclosure of FIG. 2.
Figure 5B:
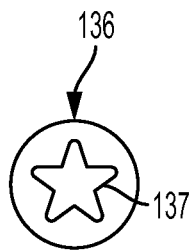
FIG. 5B is a top plan view of the fastener of FIG. 5A.

With additional reference now to FIG. 4, the front and back structures 102, 104 of the enclosure 100 each include indents 126 extending along opposite edge portions (along non-adjacent edges of the front and back structures 102, 104). When the front and back structures 102, 104 are positioned together (e.g., when being installed to the portable computing device 101, etc.), the indents 126 of the front structure 102 generally align with the indents 126 of the back structure 104 to form a pair of rails (with one rail then located on, or defined by, each of the opposite edge portions of the enclosure 100 (see, enclosure 200 in FIG. 8 where rails 228 are defined by indents 226 of front and back structures 202, 204)). With that said, it should be appreciated that the front and back structures 102, 104 may define rails generally along any of their edge portions, and not necessarily along two opposite edge portions as illustrated herein (such that the brackets 106, as described next, could be coupled to the front and back structures 102, 104 along any desired edge portions).

The brackets 106 of the enclosure 100 are configured to slide over the rails of the front and back structures 102, 104 (as shown in FIGS. 1-3) to secure the front and back structures 102, 104 together (e.g., over the portable computing device 101, etc.). In particular, each bracket 106 defines a channel 130 that is configured to receive at least a portion of the corresponding rail therein (e.g., at least a portion of the front and back structures 102, 104 defining the rail, etc.). And, when the brackets 106 are engaged to the front and back structures 102, 104, the front and back structures 102, 104 are substantially inhibited from moving apart (e.g., the brackets 106 generally hold, etc. the front and back structures 102, 104 together; etc.). In various aspects, the brackets 106 are held, or retained, on the rails of the front and back structures 102, 104 by detents generally defined by the tabs 108 and/or mating receptacles 109 of the front and back structures 102, 104 (e.g., two detents, more than two detents, fewer than two detents, etc.), each of which pairs to alignment structures 142 of the brackets 106. With that said, it should be appreciated that some embodiments may not include one or more of the tabs 108, the receptacles 109, or the alignment structures 142.

In the illustrated embodiment, the rails defined by the front and back structures 102, 104 are defined such that the brackets 106 slide onto the rails in generally opposite directions (see, enclosure 200 and FIG. 8 illustrating installation of brackets 206). This can help facilitate balance of the enclosure 100, in a user's hands, when installing the brackets 106. However, it is contemplated that, in other embodiments, the rails may be defined by the front and back structures 102, 104 so that the brackets 106 slide onto the rails in generally similar directions, or different directions than those illustrated. In still other embodiments, the brackets 106 may be configured to snap-fit over the rails defined by the enclosure 100, etc. Also in the illustrated embodiment, the brackets 106 and the rails are configured such that, when the brackets 106 are installed over the rails, the brackets 106 are substantially flush with (or are substantially coextensive with) the edge portions of the front and back structures 102, 104 (such that, when viewing the profile of the enclosure 100, the brackets 106 appear to be part of the front and back structures 102, 104). With that said, it should be appreciated that the brackets 106 may have any desired shape within the scope of the present disclosure.

The illustrated brackets 106 each include a grip 134 to allow the user to more easily grasp and secure the brackets 106 to the rails of the front and back structures 102, 104, and also to provide the user with positions to grip the enclosure 100 once the enclosure 100 is fully engaged to the portable computing device 101. The grips 134 can each be of one piece with the brackets 106 (e.g., slots cut into the brackets 106 to provide additional friction, etc.), or the grips 134 can be additional material applied to the surface of the brackets 106, etc.

In the illustrated enclosure 100, a length dimension of each of the brackets 106 is generally less than a corresponding length dimension of each of the front and back structures 102, 104. In addition, a thickness dimension of each of the brackets 106 is generally equal to or less than a corresponding thickness dimension of the enclosure 100 (i.e., of the front and back structures 102, 104 engaged together). Further, the rails defined by the front and back structures 102, 104 of the enclosure 100 are generally recessed relative to the rest of the enclosure 100. As such, and because of these features, when the brackets 106 are fully received over the rails (as shown in FIGS. 1-3), in this embodiment, the brackets 106 are generally flush with the front and back structures 102, 104 to provide the enclosure 100 with an appearance that the enclosure 100 is generally made of one piece.

As shown in FIGS. 2, 4, 5A and 5B, the enclosure 100 further includes fasteners 136 configured to secure the brackets 106 to the front and back structures 102, 104 (when the brackets 106 are installed to the front and back structures 102, 104). In particular, the fasteners 136 are configured to extend through aligned openings 138 defined in the brackets 106 and defined in the front and back structures 102, 104 (and, more particularly, in the rails defined by the front and back structures 102, 104). Thus, when the brackets 106 are fully engaged to the front and back structures 102, 104 and the fasteners 136 are installed therein, the brackets 106 are substantially inhibited from being removed from the enclosure 100. As such, the enclosure 100 is generally tamper-resistant (e.g., once installed to the portable computing device 101, etc.). It is contemplated, however, that the fasteners 136 may be removed, in some embodiments, so that the enclosure 100 can be removed from the portable computing device 101 if necessary.

Figure 6A:
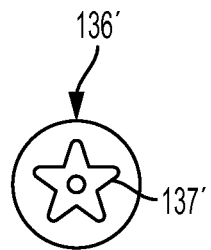
FIGS. 6A-6B are top plan views of exemplary embodiments of additional fasteners suitable for use with the enclosure of FIG. 2.
Figure 6B:
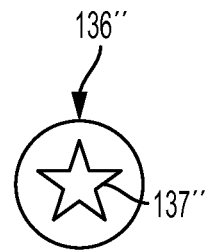

The fasteners 136 may include any suitable fasteners within the scope of the present disclosure including, for example, threaded fasteners (e.g., screws, etc.), snap-fit fasteners, etc. Further, as part of the tamper-resistant characteristic of the enclosure 100, the fasteners 136 may include features that help inhibit their removal once installed. For example, the fasteners 136 may include unique head openings 137 (e.g., hexagonal recesses, TORX® recesses (e.g., TORX®, TORX Security®, TORX Plus®, etc.), pentalobe recesses, etc.) that are only accessible by special tools for installation to and/or removal from the enclosure 100. In the illustrated enclosure 100, for example, the fasteners 136 include TORX®-head screws. However, other fasteners can be used. For example, FIGS. 6A-6B illustrate alternative embodiments of fasteners 136', 136", having alternative head openings 137', 137", that can be used with the enclosure 100. With that said, it should also be appreciated that the fasteners 136 can be positioned at any desired locations in the enclosures, including ones different than illustrated herein, and still operate to secure the brackets 106 to the front and back structures 102, 104.

In other embodiments, the brackets 106 of the enclosure 100 may be secured to the front and back structures 102, 104 by other means, for example, adhesives, other fasteners, locks, structures defined in one or more of the rails and/or brackets 106 (e.g., detents, teeth, etc.), friction, etc. that, in similar fashion to the fasteners 136, operate to inhibit the brackets 106 from reversing their movement after fully engaging the front and back structures 102, 104. In such embodiments, it may be necessary to break, cut, or release the bracket 106 in such a manner that the bracket 106 is no longer usable, functional, and/or suited to engage the front and back structures 102, 104 (however, this is not required).

The enclosure 100 further includes security features to allow the user to secure the enclosure 100, and the at least partially enclosed portable computing device 101, to another object (e.g., a library desk, or public workstation, etc.). For example, a security hole 140 (FIGS. 1 and 3) may extend through the front and back structures 102, 104 (for example, at one or more corners, etc.) to allow a security cable to be inserted there through and attached to the enclosure 100, etc. The security hole, in one example embodiment, includes a sufficient diameter (e.g., 3.0 mm, 5.00 mm, etc.), and further defines a funnel from the front and the back to aid in insertion of the security cable.

Figure 9:
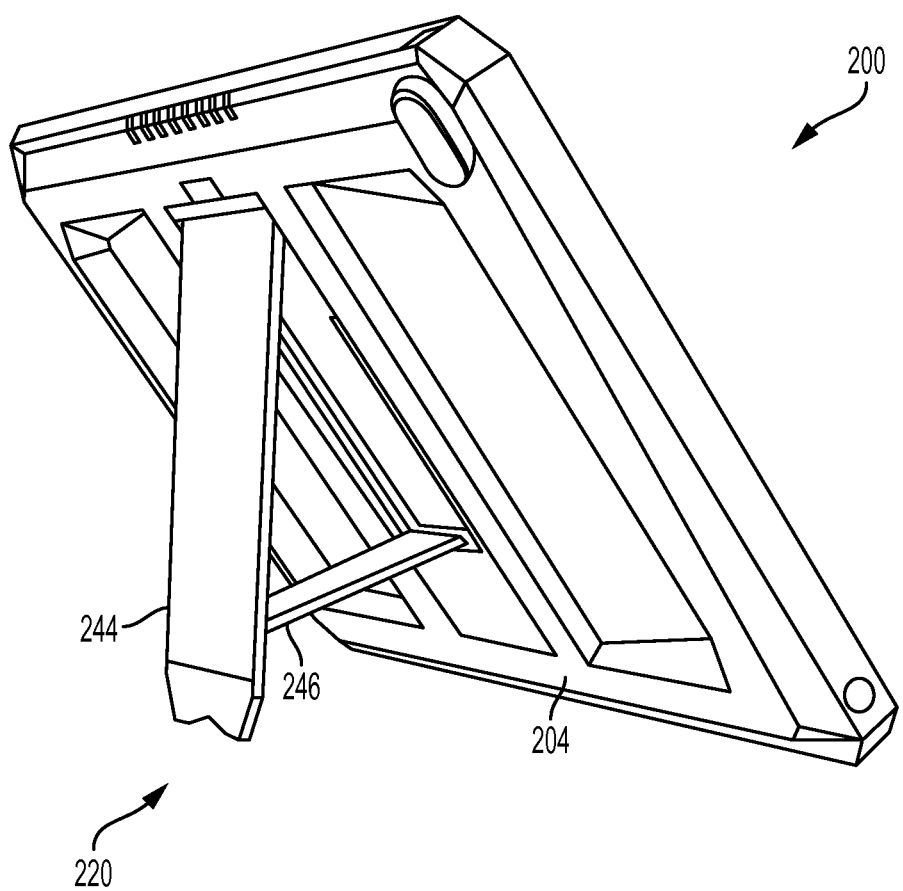
FIG. 9 is a lower perspective view of the enclosure of FIG. 7, with a stand of the enclosure shown extended.

FIGS. 7-9 illustrate another exemplary embodiment of an enclosure 200, including one or more aspects of the present disclosure. The enclosure 200 of this embodiment is substantially similar to the enclosure 100 previously described and illustrated in FIGS. 1-4. As such, similar features previously described and illustrated in FIGS. 1-4 will not be repeated. In addition, it should be appreciated that features of this embodiment, either shown in FIGS. 7-9 or described hereinafter, can be implemented in the enclosure 100 previously described (or in any embodiment of enclosure described herein), and vice-versa.

As shown in FIG. 7, the enclosure 200 includes front and back structures 202, 204 with openings 216 configured to receive straps 242, and thereby couple the straps 242 to the enclosure 200. The straps 242 can then be used to carry the enclosure 200 (and a portable computing device 201 secured therein), etc., as desired (e.g., over a shoulder of a user, etc.). Or, the straps 242 may be used to secure the enclosure 200 to another object (e.g., a library desk, or public workstation, etc.), etc. The straps 242 can be made of any suitable material such as, for example, polyester, cloth, rubber, plastic, latex, and/or some combination thereof, etc.

As shown in FIG. 8, when the front and back structures are positioned together, rails 228 are defined by indents 226 of the front and back structures 202, 204. Brackets 206 can then be positioned onto the rails 228 (and, in some embodiments, secured thereto when moving onto the rails 228), by sliding the brackets in generally opposite directions. In addition, the illustrated brackets 206 include teeth 250 configured to help hold (or couple) the bracket to the front and back structures 202, In particular, the teeth 250 of the brackets 206 are configured to fit in openings 252 defined in the front and back structures 202, 204. With that said, it should be appreciated that, in some embodiments, the brackets 206 may not include such teeth 250 and the front and back structures may not include such openings 252.

And, as shown in FIG. 9, the enclosure 200 includes a stand 220 coupled to the back structure 204. In this embodiment, the stand 220 also includes a support 244 and a moving arm 246 that, together, support the stand 220 when in a deployed position. The support 244 is coupled to a base of the stand 220 and to the moving arm 246. As such, the support 244 moves generally automatically with the stand 220 between the deployed position and a stored position.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that exemplary embodiments may be embodied in many different forms, and that neither should be construed to limit the scope of the disclosure. In some exemplary embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An enclosure for a portable computing device, the enclosure comprising:
   a front structure defining at least one aperture for permitting access to a display of the computing device;
   a back structure configured to couple to the front structure, the front structure and back structure configured to cooperate to substantially enclose at least four corners of the portable computing device; and
   at least one bracket configured to engage the front and back structures, the at least one bracket including a tamper-resistant fastener configured to secure the front and back structures together on the portable computing device, the at least one bracket including two brackets; each of the two brackets defining a channel configured to receive at least part of the front and back structures; and each of the two brackets configured to be slideably received by different sides of the front and back structures when coupled together.

2. The enclosure of claim 1, wherein the enclosure is configured such that the two brackets are slideably received in opposite directions to engage the front and back structures.

3. The enclosure of claim 2, wherein the front and back structures establish a profile, and the two brackets each fit substantially within the profile when the brackets are received onto the front and back structures.

4. The enclosure of claim 1, wherein the tamper-resistant fastener includes a head having a recess configured to be engaged by a tool; and
   wherein the recess includes at least one of: a hexagonal recess and a TORX® recess.

5. The enclosure of claim 1, wherein at least one of the front structure and the back structure includes at least one aperture to permit access to a port of the portable computing device.

6. The enclosure of claim 1, wherein the front structure is configured to protrude outward from the portable computing device when the front structure is coupled to the portable computer device.

7. The enclosure of claim 1, further comprising a stand coupled to the back structure, wherein the stand is configured to elevate the portable computing device at an angle on a surface.

8. The enclosure of claim 7, wherein the stand is removably coupled to the back structure.

9. The enclosure of claim 7, wherein the back structure defines at least one cavity adjacent to the stand.

10. An enclosure for a portable computing device, the enclosure comprising:

a first structure defining at least one aperture for permitting access to a display of the portable computing device;

a second structure configured to couple to the first structure, the first structure and second structure configured to cooperate to substantially enclose at least four corners of the portable computing device; and tamper-resistant means for locking the first structure and second structure together;

wherein the tamper-resistant means includes two brackets, each of the brackets including a channel configured to receive at least part of the first and second structures; and wherein the enclosure is configured such that the brackets are slideably received by different sides of the first and second structures.

11. The enclosure of claim 10, wherein each of the brackets includes teeth configured to engage the first structure and/or the second structure to inhibit the bracket from moving once received by the first structure and the second structure.

12. The enclosure of claim 10, wherein the tamper-resistant means further includes at least one fastener.

13. The enclosure of claim 10, wherein the tamper-resistant means is separate from the first and second structures and is configured to engage the first and second structures.

14. The enclosure of claim 10, wherein the two brackets are disposed on opposite ones of the different sides of the first and second structures when the brackets are received onto the first and second structures.

15. The enclosure of claim 14, wherein the enclosure is configured such that the two brackets are slidable in opposite directions to engage the first and second structures.

16. The enclosure of claim 10, wherein the tamper-resistant means further includes a head having a recess configured to be engaged by a tool, the recess including at least one of: a hexagonal recess and a TORX® recess.

17. The enclosure of claim 10, wherein at least one of the first structure and the second structure includes at least one aperture to permit access to a port of the portable computing device.

18. The enclosure of claim 10, wherein the first structure is configured to protrude outward above a screen side of the portable computing device when the first structure encloses the at least four corners of the portable computing device.

19. The enclosure of claim 10, further comprising a stand coupled to the back structure, wherein the stand is configured to elevate the portable computing device at an angle on a surface.

20. The enclosure of claim 10, wherein the first and second structures define a profile, and the two brackets each fit substantially within the profile when the brackets are received onto the first and second structures.

* * * * *